(No Model.) 4 Sheets—Sheet 1.

D. S. RICHARDSON.
HOT WATER HEATING APPARATUS.

No. 418,589. Patented Dec. 31, 1889.

Witnesses:
Arthur Ashley
G. W. Ashley

Inventor:
Dwight S. Richardson
per (No Model.) 4 Sheets—Sheet 2.
D. S. RICHARDSON.
HOT WATER HEATING APPARATUS.
No. 418,589. Patented Dec. 31, 1889.
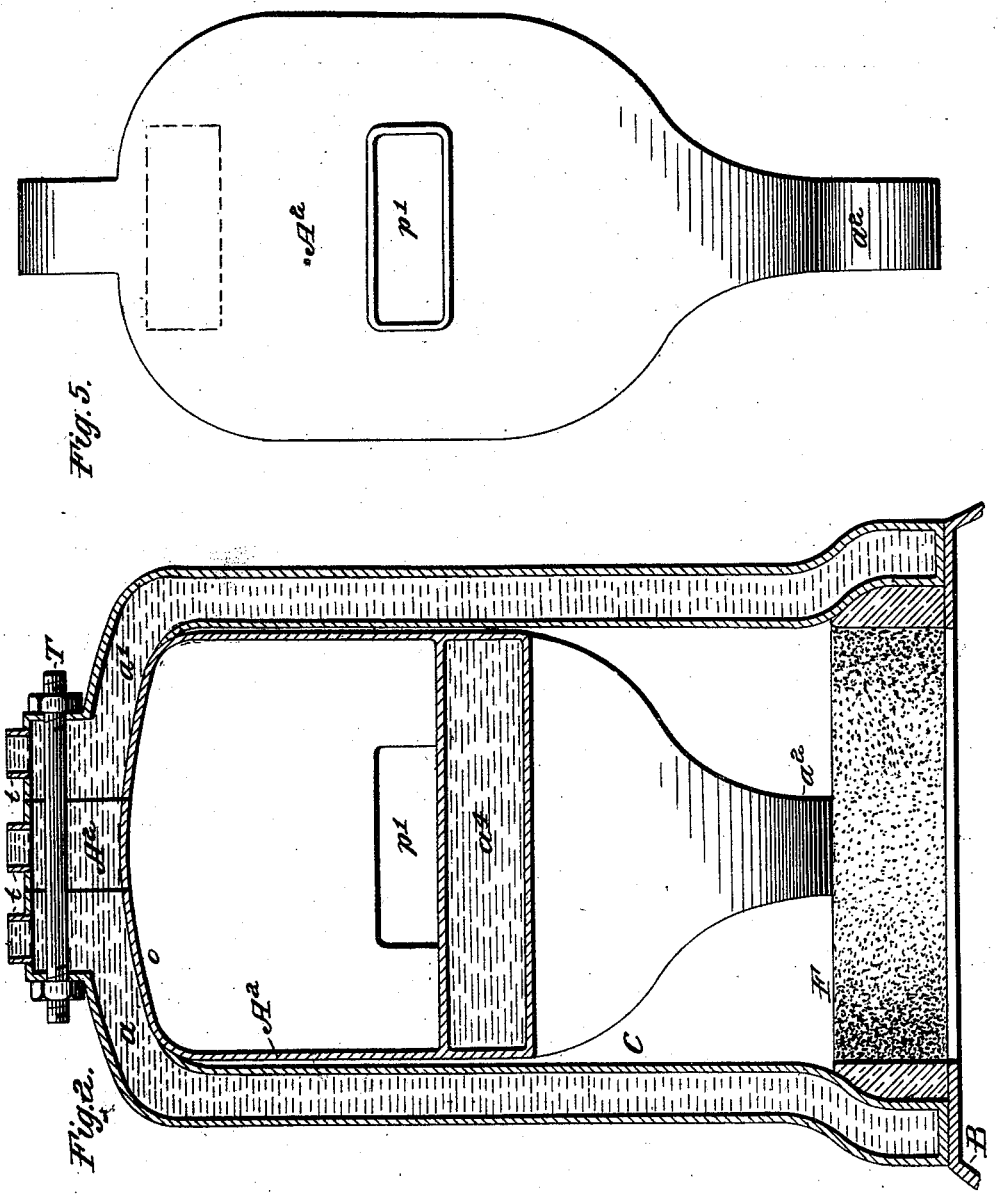

(No Model.) 4 Sheets—Sheet 3.

D. S. RICHARDSON.
HOT WATER HEATING APPARATUS.

No. 418,589. Patented Dec. 31, 1889.

Witnesses:
Arthur Ashley
G. K. Ashey

Inventor:
Dwight S. Richardson
per J. H. Ashley Atty.

(No Model.) 4 Sheets—Sheet 4.

D. S. RICHARDSON.
HOT WATER HEATING APPARATUS.

No. 418,589. Patented Dec. 31, 1889.

Witnesses:
Arthur Ashley

Inventor:
Dwight S. Richardson
per J. U. Ashley atty.

UNITED STATES PATENT OFFICE.

DWIGHT S. RICHARDSON, OF BROOKLYN, NEW YORK.

HOT-WATER HEATING APPARATUS.

SPECIFICATION forming part of Letters Patent No. 418,589, dated December 31, 1889.

Application filed October 24, 1889. Serial No. 327,999. (No model.)

*To all whom it may concern:*

Be it known that I, DWIGHT S. RICHARDSON, a citizen of the United States, residing in the city of Brooklyn, in the county of Kings, in the State of New York, have invented a new and useful Hot-Water Heating Apparatus, of which the following is a description.

The invention relates to that class of heaters in which a body of water conducted to a dwelling or other structure from a street-main or other convenient source of supply is introduced into a water-chamber which is contiguous to the fuel and combustion chamber of a heating-furnace, the water-chamber having pipe-connections which are extended into the several stories and into various apartments of the building and thence back to the lower extremity of the water-chamber, the whole constituting water-circuits, one or many, through which heat absorbed by the fluid finds its way to the most remote portions of the structure, a warmed column of water continually rising from the upper portion of the water-chamber through transmission by convection of the heat particles, while a cool column descends to the lower extremity of the same, to be again exposed to the heat of the fuel-chamber.

The object of the invention is to produce an apparatus having the general characteristics above indicated, in which the body of water shall be more fully exposed to the heat of the furnace and be more quickly and thoroughly heated than in former examples of this class; and the invention consists in the novel construction, which will first be described in detail, and afterward specifically indicated in the concluding paragraphs of this specification.

In the accompanying drawings, which constitute a part of this description, the circulation-pipes, which compose no portion of this invention, are omitted.

Figure 1:
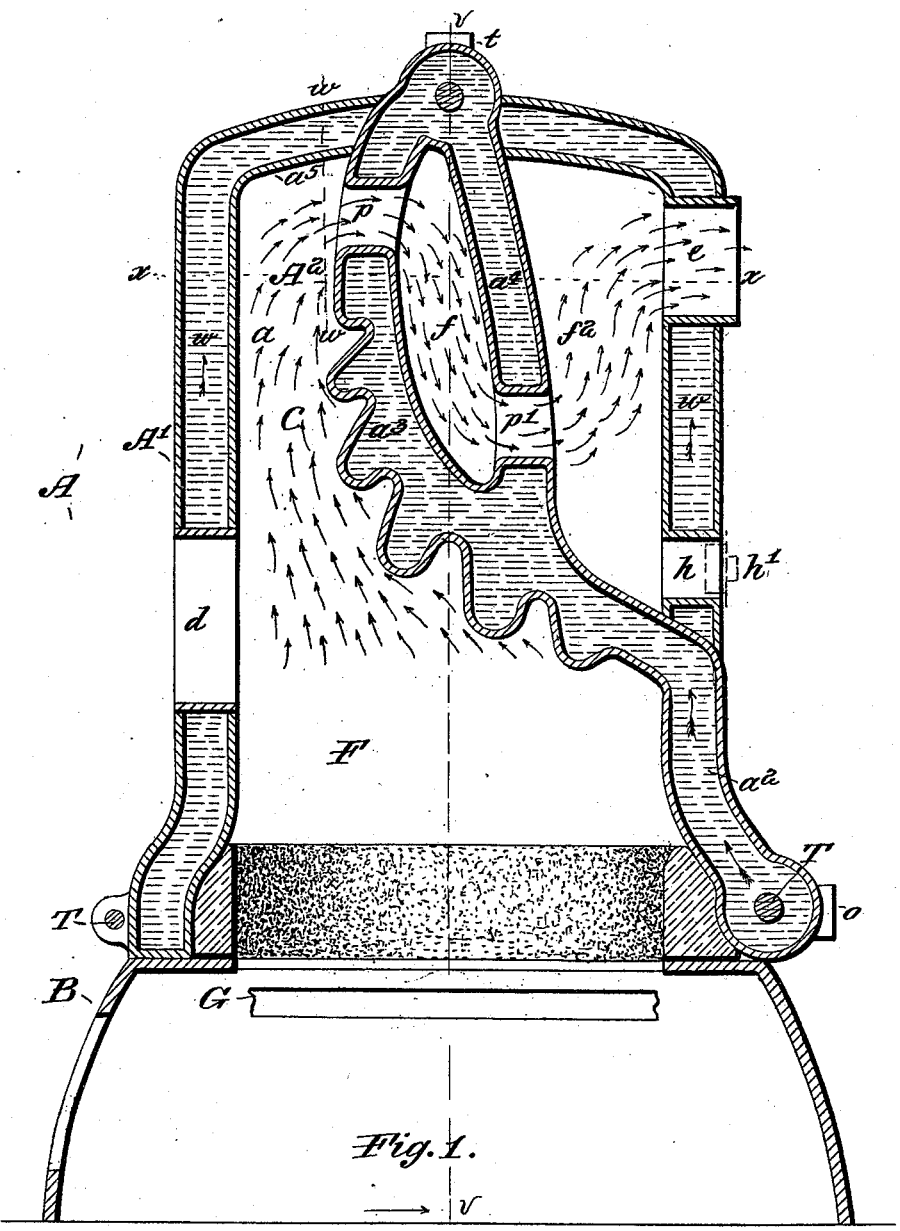
Figure 6:
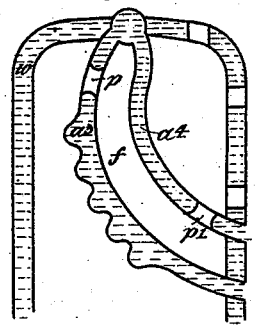
Figure 7:
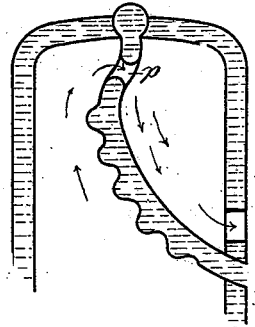
Figure 10:
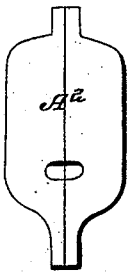
Figure 8:
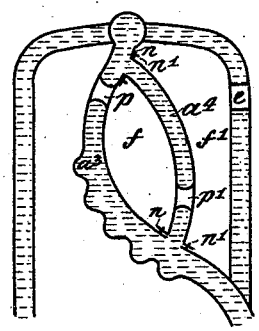
Figure 9:
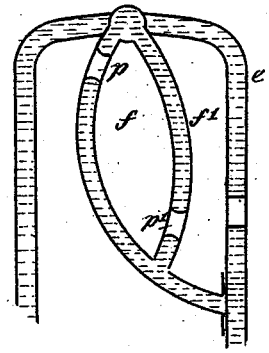
Figure 3:
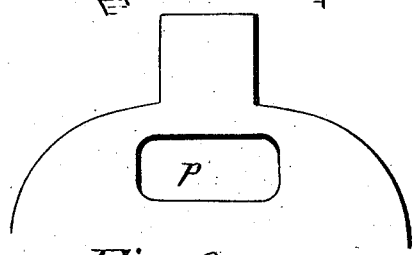
Figure 4:
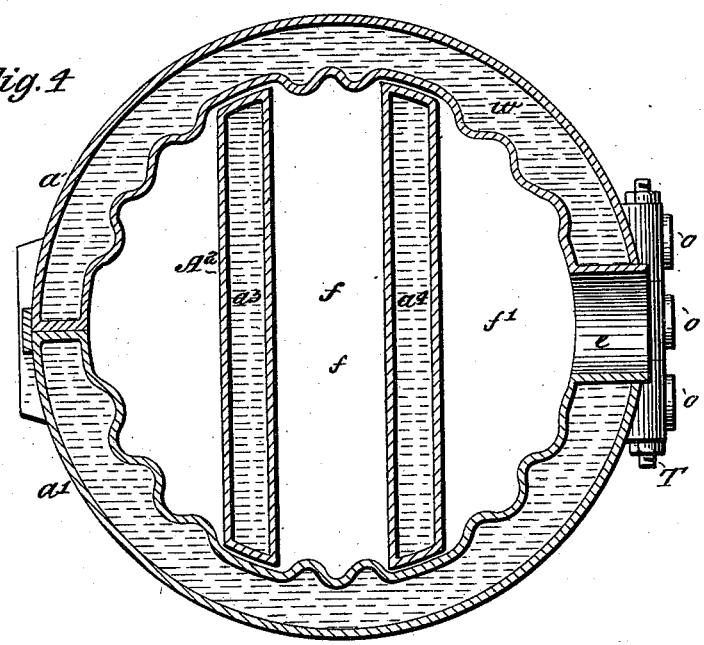
Figure 11:
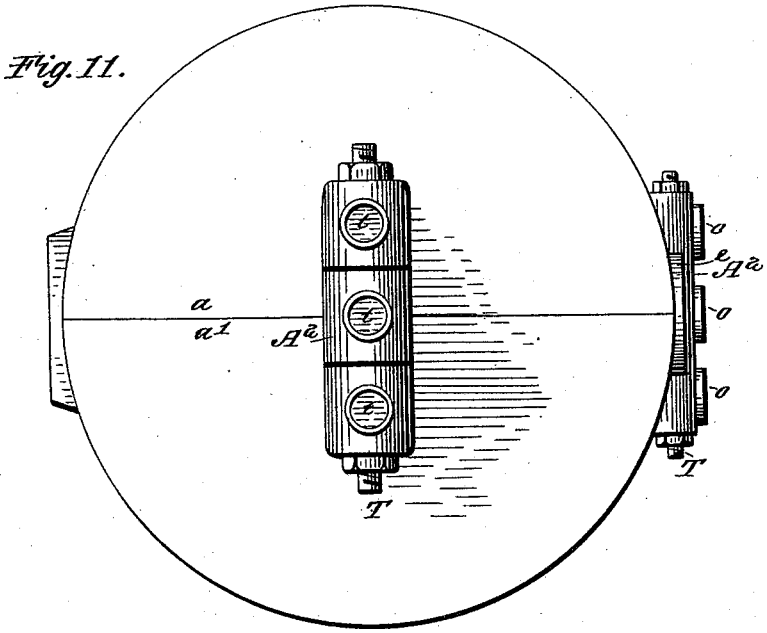

Figure 1 represents a vertical central section, from front to rear, of the apparatus. Fig. 2 is a vertical central section in the line *v v* of Fig. 1, looking in the direction of the rear of the heater. Fig. 3 is a partial vertical section, looking toward the rear, in the line *w w* in Fig. 1. Fig. 4 is a horizontal section in the line *x x* in Fig. 1. Fig. 5 is a rear view of the central or intermediate water-section detached. Fig. 6 is a central longitudinal section of a modified construction. Fig. 7 is a central longitudinal section showing a single water-passage. Figs. 8, 9, and 10 are detail modifications to be referred to. Fig. 11 is a top plan view of the apparatus.

The base B and the grate G of the apparatus A may be of any ordinary or preferred construction, the base being in practice provided with suitable doors for access to the ash-pit and for admission and regulation of draft-air.

The body or water-chamber section A' of the apparatus is, as here represented, composed of three vertically-extending divisions—a right double-walled side section $a$, a left double-walled side section $a'$, and an intermediate double-walled interior and rear central section $A^2$, which extends in its main portion obliquely across the combustion-chamber C of the furnace proper. The walls of the body A' are preferably perpendicular and as a whole cylindrical; but, if desired, they may in some instances be somewhat tapered or indrawn from the base upwardly. The intermediate or interior section $A^2$ is laterally recessed or indrawn at its upper extremity to adapt it to be received between the two side sections $a$ and $a'$, and its lower extremity is similarly indrawn for a like reason and to form the leg $a^2$, which is received between and communicates with the corresponding lower portions of such side sections, the broader or spread-out main portion of such intermediate section extending across the combustion-chamber, as shown, from a point at or near the upper extremity of the fuel-chamber F to the upper extremity or dome-like top $a^5$ of the heater, to the surface of the inner walls of which combustion-chamber its sides are closely conformed.

As most clearly seen in Figs. 1 and 4, the intermediate section $A^2$ is in its main upper portion divided for a considerable distance to form a front water-passage $a^3$ and a rear water-passage $a^4$. In the upper portion of the front water-passage is provided a smoke-passage or short flue $p$, and in the lower portion of the rear water-passage is a corresponding smoke passage or flue $p'$.

In the operation of the apparatus water, which is received through the pipe-openings $o$ and other like openings (not shown) in the lower portion of the apparatus, will pass in part through the exterior water-chamber $w$, as indicated by the single-barbed arrows, between the vertical walls of the body $A'$ and in part through the leg $a^2$ and the passages $a^3$ $a^4$ of the interior section $A^2$, as shown by full-barbed arrows, to the upper extremity of the apparatus, whence it will pass through the water-tubes $t$ to the apartments which are to be warmed. Fuel being supplied through the opening $d$ at the front of the furnace, the volatile products of combution will rise at the front of the combustion-chamber and be carried through the passage $p$ into the descending flue $f$, from which they will escape through the passage $p'$ into the rising flue $f^2$, from which they will be discharged through the smoke-exit opening $e$ in the upper rear portion of the heater-shell, as indicated by the unfeathered arrows. Accumulations of soot and ashes at the bottom of the rear rising flue $f^2$ will be removed through a clearing-opening $h$ in the wall of the heater, which will be accessible upon removal of its door or closing-plate $h'$.

The vertical sections $a$, $a'$, and $A^2$ will be rigidly secured together by through-bolts T, suitable bearing-plates and washers being provided to render the joints secure against leakage of water.

It will be understood that suitable packing will be provided at the meeting edges of the sections to insure water-tight connections.

The inner wall of the shell of the right and left side sections, including the dome or rounded top thereof, will preferably be strengthened and the heat-receiving surface of the same increased by corrugations, which may embrace the whole or a portion only of the interior area of such sections, the sides or edges of the intermediate water-section being correspondingly either corrugated or plain, according to the conformation of the shell at their points of coincidence.

It will be obvious that the construction above described might be slightly modified in various ways without affecting the operation or in any wise departing from the essential purpose and spirit of the invention. For instance, it will be manifest that the operation would be the same and an equally advantageous result produced if the front and rear water passages or chambers $a^3$ and $a^4$ were made separate and independent, the smoke-passages $p$ and $p'$ being provided, respectively, in each in the same relation to the combustion-chamber and to the other portions of the heater. Such a modification is represented in Fig. 6, which shows also in dotted lines three distinct points of exit $i$, $k$, and $l$, for the products of combustion, either opening being employed, while the others will be closed by any suitable cap applied to the collars thereof. Under this construction the single opening $h$ would serve for the clearance of deposits of soot, ashes, and other refuse from the rear surface of both of these interior water passages or chambers.

In Fig. 7 the intermediate water-section is composed of a single water chamber or passage, and the smoke-exit opening is at a point near the base of the spread-out portion of the water-section. This chamber, although it constitutes a part of the rear wall of the heater and a part of the top or the dome of the same, and although under this construction the section is enveloped front and rear by the products of combustion, comes short of my preferred construction as exemplified in Figs. 1 to 5, because under it the products of combustion in their descent behind it are less effectively utilized, being in a less restricted or less compressed condition.

In Fig. 8 the rear water-passage of the intermediate section is represented as made separately and subsequently attached to the front or main portion of such section, suitable perforated flanges $n$ $n$ being provided on each to receive securing-bolts $n'$ $n'$.

It will be observed that the products of combustion pass in a vertical plane along both the corrugated front surface and along the rear surface of the water passage or passages of which the interior section is composed, thus insuring thorough utilization of the heat contained in such products.

In Fig. 9 the intermediate water-section is represented as attached by a flange-connection to the inner wall of the double-walled shell.

In Fig. 10 the intermediate water-circulating member is represented as composed of two longitudinal intercommunicating parts placed side by side.

Having described my invention, what I claim is—

1. A hot-water heating apparatus in which the body or water-chamber portion is composed of vertical intercommunicating double-walled sections, each of which constitutes a part of the outer portion or inclosing-shell of the heater, and one of which extends across the interior of the heater from a point in a plane with the upper extremity of the fuel-chamber to the upper extremity of the combustion-chamber.

2. A hot-water heating apparatus the body or exterior water-shell of which is composed of vertical double-walled water-sections, one of which has an outspreading dividing middle portion or diaphragm which extends across the combustion-chamber of the apparatus from the lower to the upper extremity of such chamber.

3. A hot-water heating apparatus the body or shell of which is composed of vertically-arranged water-sections, one of which constitutes also a part of the top of the combustion-chamber, and which has a central outspread portion which extends from bottom to top and from side to side of such combustion-chamber and divides it into a front rising flue and a rear diving-flue.

4. A hot-water heating apparatus which is provided with an interior water-chamber which extends across the combustion-chamber from the lower to the upper extremity thereof, and which has an upper inlet, a lower outlet, and an intermediate diving-flue for the passage of the products of combustion.

5. A hot-water heating apparatus which is composed of vertical water-sections, one of which has an outspread middle portion which extends from the upper extremity of the fuel-chamber diagonally across the combustion-chamber of the apparatus from the lower to the upper extremity of such chamber.

6. A hot-water heating apparatus which is composed of vertically-arranged water-sections, one of which has a central outspread portion which extends from side to side of the combustion-chamber and divides it into a front rising flue and a rear diving-flue.

DWIGHT S. RICHARDSON.

Witnesses:
W. M. MACKAY,
ARTHUR ASHLEY.